(12) United States Patent
Li et al.

(10) Patent No.: US 11,416,503 B2
(45) Date of Patent: Aug. 16, 2022

(54) MINING DATA FOR GENERATING CONSUMABLE COLLABORATION EVENTS

(71) Applicant: Microsoft Technology Licensing, LLC, Redmond, WA (US)

(72) Inventors: Karvell Ka Yiu Li, Bellevue, WA (US); Sharon Hang Li, Redmond, WA (US); Yimeng Li, Sammamish, WA (US); Dhaliwal Maninderjit Singh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 301 days.

(21) Appl. No.: 15/893,422

(22) Filed: Feb. 9, 2018

(65) Prior Publication Data

US 2019/0251197 A1  Aug. 15, 2019

(51) Int. Cl.
| | |
|---|---|
| *G06F 16/10* | (2019.01) |
| *G06F 16/20* | (2019.01) |
| *G06Q 10/10* | (2012.01) |
| *G06F 16/2458* | (2019.01) |
| *G06F 16/14* | (2019.01) |

(52) U.S. Cl.
CPC ........ *G06F 16/2465* (2019.01); *G06F 16/156* (2019.01); *G06Q 10/101* (2013.01); *G06F 2216/03* (2013.01)

(58) Field of Classification Search
CPC ............ G06F 16/2465; G06F 16/156
See application file for complete search history.

(56) References Cited

U.S. PATENT DOCUMENTS

| | | | |
|---|---|---|---|
| 6,591,265 B1 | 7/2003 | Erickson et al. | |
| 9,514,417 B2 | 12/2016 | Kumar et al. | |
| 10,671,281 B2 | 6/2020 | Zhai et al. | |
| 2005/0222985 A1* | 10/2005 | Buchheit | G06Q 10/107 |
| 2006/0253427 A1 | 11/2006 | Wu et al. | |
| 2011/0296300 A1 | 12/2011 | Parker | |
| 2012/0246563 A1 | 9/2012 | Nusbaum | |
| 2012/0265520 A1 | 10/2012 | Lawley | |
| 2013/0191719 A1* | 7/2013 | Underhill | G06Q 10/10 715/231 |

(Continued)

FOREIGN PATENT DOCUMENTS

WO  2017196685 A1  11/2017

OTHER PUBLICATIONS

"Non-Final Office Action Issued in U.S. Appl. No. 16/020,994", dated Oct. 8, 2019, 19 Pages.

(Continued)

*Primary Examiner* — Kristopher Andersen

(57) ABSTRACT

Aspects of the present disclosure relate to systems and methods for providing consumable collaboration insights related to a file in a collaboration environment. In one aspect, data associated with at least one of a file and collaborators of the file is mined. One or more collaboration events related to the file may be determined using the mined data. A summary of the one or more collaboration events related to the file may be generated. The summary of the one or more collaboration events may be sent to a client computing device for displaying a summarized view of the one or more collaboration events as a collaboration pane within the file.

20 Claims, 7 Drawing Sheets

(56) References Cited

U.S. PATENT DOCUMENTS

| | | | |
|---|---|---|---|
| 2013/0198257 A1* | 8/2013 | Simmons | H04W 8/18 709/203 |
| 2014/0104320 A1 | 4/2014 | Davidson et al. | |
| 2014/0310213 A1 | 10/2014 | Badger et al. | |
| 2014/0310345 A1 | 10/2014 | Megiddo et al. | |
| 2015/0113072 A1 | 4/2015 | Chan et al. | |
| 2015/0120724 A1 | 4/2015 | Prager et al. | |
| 2015/0169531 A1* | 6/2015 | Campbell | G06F 3/0488 715/212 |
| 2016/0147788 A1 | 5/2016 | Ables | |
| 2016/0371241 A1* | 12/2016 | Wong | G06F 9/445 |
| 2017/0010869 A1 | 1/2017 | Heiney et al. | |
| 2017/0075584 A1 | 3/2017 | Tormasov et al. | |
| 2017/0140025 A1 | 5/2017 | Milvaney et al. | |
| 2017/0177182 A1 | 6/2017 | Wong et al. | |
| 2017/0193201 A1 | 7/2017 | Eccleston et al. | |
| 2017/0285890 A1* | 10/2017 | Dolman | G06F 3/0482 |
| 2017/0323089 A1 | 11/2017 | Duggal et al. | |
| 2017/0364866 A1* | 12/2017 | Steplyk | G06Q 10/101 |
| 2018/0189311 A1 | 7/2018 | Newhouse et al. | |
| 2018/0276745 A1 | 9/2018 | Paolini-subramanya et al. | |
| 2019/0205372 A1 | 7/2019 | Li et al. | |
| 2020/0004808 A1 | 1/2020 | Yao et al. | |

OTHER PUBLICATIONS

"Final Office Action Issued in U.S. Appl. No. 16/020,994", dated Feb. 10, 2020, 21 Pages.

"International Search Report and Written Opinion Issued in PCT Application No. PCT/US2019/016208", dated Mar. 28, 2019, 13 Pages.

Non-Final Office Action Issued in U.S. Appl. No. 16/020,994, dated Jun. 17, 2020, 21 Pages.

* cited by examiner

FIG 2A

History: strategy session

- Title Slide (21)
- Title and Content (22)
- (23)
- Conclusion (24)

Two column Layout with Table

- First bullet goes here
- Second bullet goes here
- Third bullet goes here

| | Value 1 | Value 2 | Value 3 |
|---|---|---|---|
| Item 1 | | | 25 |
| Item 2 | | | 27 |
| Item 3 | | | 29 |

204

Save a copy   Restore this Version

Hello Sharon
Here is some info you might find useful about this file.

Have questions about this document? Contact:

Tina Smith (Top contributor and in your collaboration network)

Dani Riley (Top contributor)

Meetings on your calendar relevant to this file:
Strategy session with Tina Smith at 10am, 2/10/18

Want to talk to someone who edited this file? Here are upcoming meetings on your calendar
augmentation loop standup with Dani Riley at 10:45AM, 2/11/18

206

208A  208B  208C

220

200A

12:38

MINING DATA FOR GENERATING CONSUMABLE COLLABORATION EVENTS

BACKGROUND

Computer and software users have grown accustomed to user-friendly software applications for co-authoring files, documents, messages, and the like. As more users share, co-author, and collaborate on documents created with these applications, it becomes increasingly difficult for users to stay apprised of collaboration happening around the documents, whether users are in or away from the applications. Current techniques for solving this problem include presenting changes made to the document without additional information and/or require a user to navigate to multiple applications or find other people to identify additional data related to the document. As such, current techniques for apprising users of collaboration around a document are complex, tedious, difficult to learn, and require a user to navigate through multiple applications and open multiple windows, screens and views.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for providing consumable collaboration insights related to a file in a collaboration environment. In one aspect, data associated with at least one of a file and collaborators of the file is mined. One or more collaboration events related to the file may be determined using the mined data. A summary of the one or more collaboration events related to the file may be generated. The summary of the one or more collaboration events may be sent to a client computing device for displaying a summarized view of the one or more collaboration events as a collaboration pane within the file.

In another aspect, rendering of a file associated with an application may be initiated in a user interface of a client computing device. Content associated with the file may be obtained from a data service. The content associated with the file may include at least one or more collaboration events related to the file. A summarized view may be generated using the one or more collaboration events related to the file. The summarized view may be displayed as a collaboration pane within the file in the user interface.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2A illustrates one view in a progression of views of an application, according to an example aspect.

DETAILED DESCRIPTION

Figure 1:
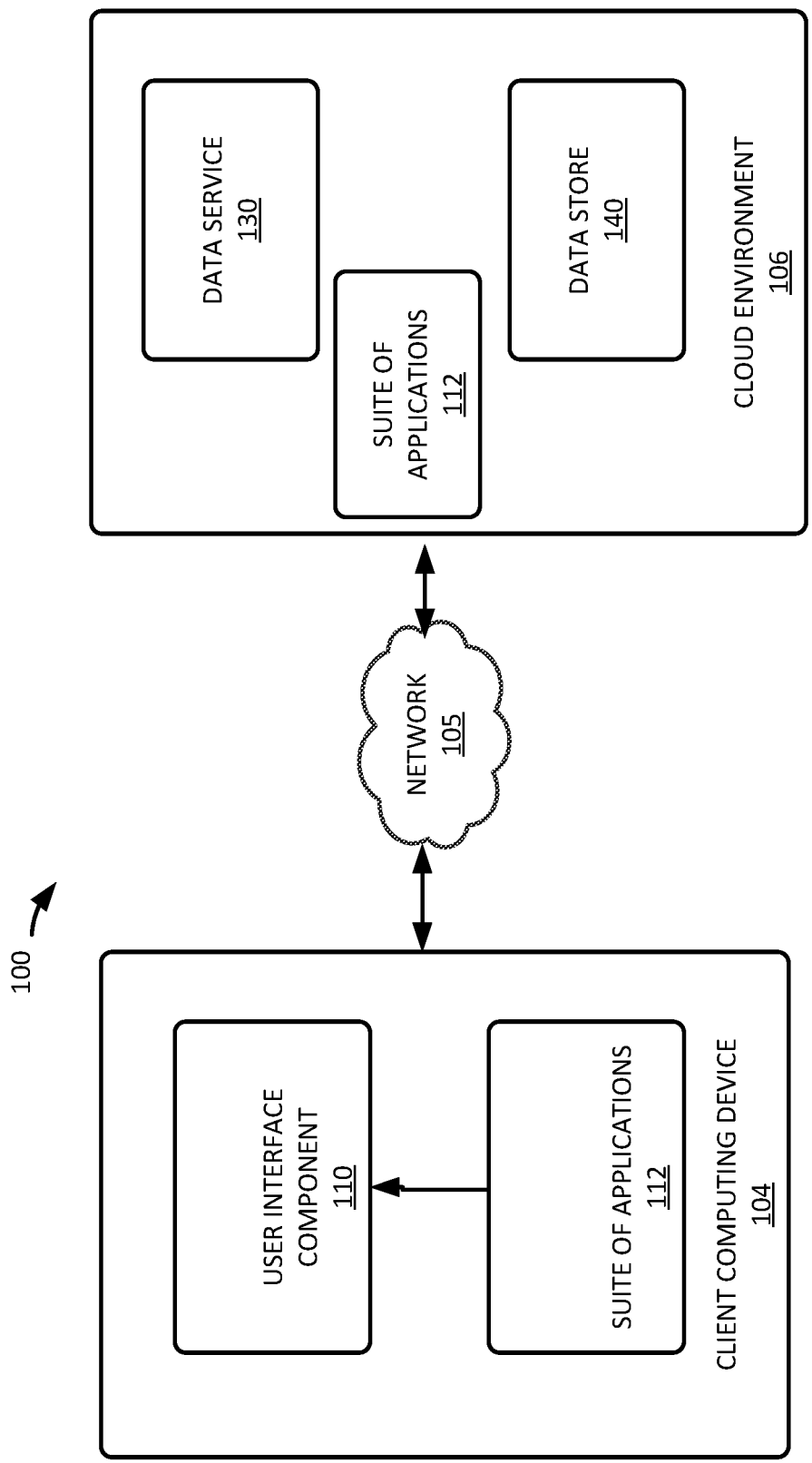
FIG. 1 illustrates an exemplary data system for providing consumable collaboration insights related to a file in a collaboration environment, according to an example aspect.

Aspects of the disclosure are generally directed to providing consumable collaboration insights related to a file in a collaboration environment. For example, data related to a file such as interactions with the file, collaborators of the file, emails associated with the file, calendar events associated with the file, past activities associated with the file, and the like, may be mined and processed to generate collaboration events (e.g., insights) related to the file. The generated collaboration events may give insight to an author of the file about collaboration happening around the file. In one example, the collaboration events are presented as a summary within the file. In this regard, the file may include a summarized view of the collaboration events displayed as a collaboration pane within the file. In this regard, the user interface to the file includes a summary of a limited set of data facilitating easy viewing and interaction with collaboration data associated with the file in one window.

As discussed above, as more users share, co-author, and collaborate on documents created with these applications, it becomes increasingly difficult for users to stay apprised of collaboration happening around the documents, whether users are in or away from the applications. Current techniques for solving this problem include presenting changes made to the document without additional information and/or require a user to navigate to multiple applications and/or find other people to identify additional data related to the document. As such, current techniques for apprising users of collaboration around a document are complex, tedious, difficult to learn, and require a user to navigate through multiple applications and open multiple windows, screens and views.

Accordingly, aspects described herein include providing consumable collaboration insights related to a file in a collaboration environment. In one example, data associated with at least one of a file and collaborators of the file may be mined and processed. The data may include at least one of messaging data, communication activities, comments, replies to comments, email activities, a presentation of the file, a time at which the file is printed, and a time at which the file is co-authored, a recipient of a shared file, renaming a file, editing a file, sharing a file, @mentions, and information associated with a restored file. When the data is mined, the system may determine one or more collaboration events related to the file using the mined data. For example, the one or more collaboration events may include events such as a meeting, a calendar event, an email, a top contributor, a heat map, a share, an unwanted edit, and a storage location.

In some examples, a summary of the one or more collaboration events related to the file may be generated. In one example, the summary of the one or more collaboration events is sent to a client computing device. The client computing device may generate a summarized view using the one or more collaboration events related to the file. The summarized view including the one or more collaboration events may be displayed as a collaboration pane within the file in the user interface. In one example, the file is associated with a first application such as an Office application. At least some of the one or more collaboration events may be associated with a second application such as an email application. At least some of the one or more collaboration events associated with the second application are viewable without leaving the first application. As such, an author of the file may view an email in the collaboration pane of the file without leaving the file and without requiring the launching/opening of the email application.

As such, a technical effect that may be appreciated is that by utilizing a single application for providing collaboration events around a file (e.g., when a user opens a document, a collaboration pane including a summarized view of collaboration events is presented adjacent to the file content) without requiring a second application associated with one or more of the collaboration events to be launched, less computing resources are utilized. For example, by only requiring the execution of a single application, at the very least, processor load may be reduced and memory may be conserved. Furthermore, by displaying collaboration events around a file in a summarized view as a collaboration pane within the file, another technical effect that may be appreciated is that the user interface of computing devices (e.g., a client computing device) is improved. For example, the claims are directed to a particular manner of summarizing and presenting/displaying information (e.g., collaboration events associated with a file) in computing devices (e.g., in particular in user interfaces to files/documents). Another technical effect that may be appreciated includes improving and increasing user interaction performance with the user interface (e.g., improving the efficiently of using the computing device). For example, a user only needs to interact with the file to view and access data associated with another application. For example, a user is not required to navigate to another application, open it up and navigate within the other application to view the data. Additionally, the speed of the user's navigation through various views and windows is improved.

Referring now to the drawings, in which like numerals represent like elements through the several figures, aspects of the present disclosure and the exemplary operating environment will be described. With reference to FIG. 1, one aspect of a data system 100 for providing consumable collaboration insights related to a file in a collaboration environment is illustrated. The data system 100 may include a client computing device 104 and a cloud environment 106. In aspects, the data system 100 may be implemented on the client computing device 104. In a basic configuration, the client computing device 104 is a handheld computer having both input elements and output elements. The client computing device 104 may be any suitable computing device for implementing the data system 100 for providing consumable collaboration insights related to a file in a collaboration environment. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the data system 100 for providing consumable collaboration insights related to a file in a collaboration environment may be utilized.

In aspects, the data system 100 may be implemented in the cloud environment 106. The cloud environment 106 may provide data to and from the client computing device 104 through a network 105. In one example, the cloud environment 106 may include productivity software services such as Office 365®. In aspects, the data system 100 may be implemented in more than one cloud environment 106, such as a plurality of cloud environments 106. As discussed above, the cloud environment 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the data system 100 may include the client computing device 104 and the cloud environment 106. The various components may be implemented using hardware, software, or a combination of hardware and software. In aspects, the client computing device 104 may include a user interface component 110 and a suite of applications 112. In one case, the suite of applications 112 may include any number of applications such as a word processing application, a spreadsheet application, an electronic slide presentation application, and the like. In one case, a file associated with an application within the suite of applications 112 may include a word document, a spreadsheet, an electronic slide presentation, and the like. As such, an exemplary application may be an electronic slide presentation application. In this example, an exemplary file associated with the electronic slide presentation application may include an electronic slide presentation. As such, in one example, the user interface component 110 may receive, render and/or display the electronic slide presentation and/or a summarized view of collaboration events. It is appreciated that user interface component 110 may receive, render and/or display any number of files associated with any number of applications.

The user interface component 110 may initiate rendering of a file created with a collaboration application in a user interface of the client computing device 104. In one example, a collaboration application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. As such, an exemplary application may be an electronic slide presentation application. In this example, an exemplary file associated with the electronic slide presentation application may include an electronic slide presentation.

In another example, the user interface component 110, the suite of applications 112, and/or the file rendered in the user interface of the client computing device 104 may obtain content associated with the file from the cloud environment 106. For example, the user interface component 110, the suite of applications 112, and/or the file rendered in the user interface of the client computing device 104 may obtain content associated with the file from the data service 130. In one example, the content associated with the file includes any content created by an author of the file. In another example, the content associated with the file includes at least one or more collaboration events related to the file. The one or more collaboration events may include at least one of a meeting, a calendar event, an email, a top contributor, a heat map, a share, an unwanted edit, and a storage location. The collaboration events may be generated based on processing, mining, and/or linking data associated with the file and the collaborators of the file.

In one example, the meeting may include meetings that are directly related to the file. For example, the meetings may include a link to the file indicating the meeting is connected to/directly related to the file. For example, the link to the file included in a meeting may indicate the meeting is scheduled to discuss the file. In another example, the meeting may include meetings that have attendees who have interacted with the file. For example, the meeting may include collaborators of the file as participants in the meeting. The interaction with the file may include edits, sharing the file, comments, replying to comments, and the like.

In one example, the calendar event may include events that are directly related to the file. For example, the calendar event may be a deadline on a user's calendar related to the file. In another example, the calendar event may include events that have attendees who have interacted with the file. For example, the event may include collaborators of the file as participants in the event. The interaction with the file may include edits, sharing the file, comments, replying to comments, and the like. In one example, the email may include emails in a user's inbox directly related to the file. For example, the user of the file may receive an email including the file as an attachment or a link to file. In another example, an email thread that mentions the file may be identified in the user's inbox.

The top contributor may include one or more primary authors of the file. For example, the top contributor may include the authors who interact with the file most often. In one case, the top contributor may include an author who has made the most edits in the file. In another case, the top contributor may include the creator of the file and/or an author who has created the most content in the file. In another case, the top contributor may include one or more authors who have the most comments in the file. Any number of top contributors may be identified. In this regard, the top contributor may include more than one primary author/collaborator of the file.

The heat map may indicate a portion of the file that includes a highest level of activity within the file. For example, when the file is a word document, a particular page or paragraph may have the highest level of activity within the word document. In this example, the particular page or paragraph with the highest level of activity may include a heat map. In another example, when the file is a power point, a particular slide may have the highest level of activity within the power point. In this example, the particular slide with the highest level of activity may include the heat map. In one case, the activity may include an amount of time spent on a portion of the file, edits made to the file, comments on the file, replies to comments, and the like. In this regard, the portion of the file that includes the most edits, comments, replies to comments, and/or amount of time spent may include a heat map. In another example, the heat map indicates the portion of the file that includes the highest level of activity within the file by highlighting the portion of the file that includes the highest level of activity.

The share indicates at least a number of collaborators the file is shared with, the collaborators names, and which collaborators have read the file. For example, when a user/author of the file shares the file, the share collaboration event indicates the number of people the file is shared with, the name of each person the file is shared with and which people have viewed/read the file. In this regard, the user/author can quickly identify whether the other collaborators of the file have viewed it. The unwanted edit indicates an edit made to the file by mistake. For example, the data system 100 may detect when a user is making unwanted edits to a file. In one example, the data system 100 may detect when the user is making unwanted edits to the file by determining that the file has not been accessed by other collaborators of the file. In another example, the data system 100 may detect when the user is making unwanted edits to the file by implementing a machine learning model. In one example, when the data system 100 detects that the user is making a mistake, the data system 100 may notify the user of such mistake. In another example, when the data system 100 detects that the user is making a mistake, the data system 100 may prevent the user from making the edit.

The storage location is a location where the file is automatically stored based on one or more factors. The one or more factors may include identifying that the current user of the file and another collaborator of the file collaborate on multiple files, identifying a common storage location (e.g., a particular folder), identifying a common storage location between a user of the file and another collaborator of the file who collaborate on multiple files, and the like. In another example, the storage location may include a location where the file is automatically deleted to. For example, when a user deletes a file, the data system 100 may intelligently detect where the user wants to delete the file to.

In another example, the user interface component 110, the suite of applications 112, and/or the file rendered in the user interface of the client computing device 104 may generate a summarized view using the one or more collaboration events related to the file. In one example, the summarized view includes a summary of the one or more collaboration events related to the file. The summary of the one or more collaboration events makes viewing and identifying collaboration (e.g., collaboration events) happening around a file consumable. As discussed above, currently a user is required to open multiple applications and/or find other people who may have information about what is happening around a file to gain knowledge of collaboration happening around a file. In another example, the summarized view of the one or more collaboration events limits the amount of information/data associated with collaboration around a file presented for a user.

In another example, the user interface component 110, the suite of applications 112, and/or the file rendered in the user interface of the client computing device 104 may display the summarized view as a collaboration pane within the file in the user interface. For example, the collaboration pane may facilitate scrolling through the collaboration events while a user is in the file. In one example, the collaboration pane is displayed adjacent to the portion of the file including the file content. In this regard, a user may easily identify and view the summary of the collaboration events while viewing the content of the file. In some cases, at least some of the one or more collaboration events are associated with another application. For example, the file is associated with a first application. At least some of the one or more collaboration events are associated with a second application. For example, the first application may be an Office application as described herein. The second application may include an email application, a calendar application, and the like. For example, an email collaboration event is associated with an email application. In another example, a calendar event collaboration event may be associated with an email application and/or a calendar application. In yet another example, a meeting collaboration event may be associated with an email application and/or a calendar application. In this regard, at least some of the one or more collaboration events associated with the second application are viewable without leaving the first application (e.g., the application associated with the file). As such, by providing the summarized view of the one or more collaboration events within the file (e.g., within an Office application), launching another application, opening up other windows, and navigating through other applications is not required.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In one example, data associated with at least one of the file and the collaborators of the file may be mined at the cloud environment 106. As illustrated in FIG. 1, the cloud environment 106 may include the data service 130, the suite of applications 112, and the data store 140. As discussed above, the suite of applications 112 may include any number of applications such as a word processing application, a spreadsheet application, an electronic slide presentation application, and the like. In one case, a file associated with an application within the suite of applications 112 may include a word document, a spreadsheet, an electronic slide presentation, and the like. As such, an exemplary application may be a word processing application. In this example, an exemplary file associated with the word processing application may include a word document/file. As such, in one example, the cloud environment 106 and/or the data service 130 may host the suite of applications 112. In another example, the data store 140 may store files and data associated with the suite of applications 112.

In one example, the data service 130 may be configured to process, store, manage, and access data and/or information associated with the data system 100. For example, the data service 130 may store one or more files, documents, items, data associated with the one or more files, documents, items, and data associated with collaborators of the files, documents, items in a data store 140. In another example, the data service 130 may be configured to mine data associated with at least one of the file and the collaborators of the file. In another example, the data service 130 may be configured to analyze data associated with at least one of the file and the collaborators of the file. In one example, the data associated with the one or more files, documents, items and the data associated with collaborators of the files, documents, items stored in data store 140 may include content changes, communication activities, document content exchanges, permission requests, sharing, printing, a time associated with the activities related to the file (e.g., the time the file is printed, the time the file was shared, the time the file was edited), communications such as Instant Messaging and/or voice communications, comments, replies to comments, email activities, presentation of the file, a time at which the file is printed, a time at which the file is co-authored, the recipient of a shared file, information associated with a renamed file, sharing a file, editing a file, renaming a file, information associated with a restored file (e.g., information regarding that the file was restored from a second version to a first version), and the like. In one case, email activities may include a time at which a file was emailed, the content of the file at the time at which the file was emailed, the sender and recipient of the email, and the like.

In one example, the one or more files, documents, items, data associated with the one or more files, documents, items, and data associated with collaborators of the files, documents, items stored in data store 140 may be extracted, analyzed, and processed to determine one or more collaboration events related to the file. For example, the one or more collaboration events may be determined by identifying collaborators of the file, linking interactions with the file by the identified collaborators with data associated with collaboration events, identifying and linking collaborators of the file, interactions with the file, historical data associated with the file, and the data associated with the file (as discussed herein), and the like. In one example, mining data associated with the one or more files, documents, items, and data associated with collaborators of the files, documents, items stored in data store 140 may include extracting the data. In another example, mining data associated with the one or more files, documents, items, and data associated with collaborators of the files, documents, items stored in data store 140 may include analyzing the data (e.g., the data may be analyzed regardless of the extraction process). In yet another example, mining data associated with the one or more files, documents, items, and data associated with collaborators of the files, documents, items stored in data store 140 may include processing the data.

When the one or more collaboration events related to the file are determined using the mined data, a summary of the one or more collaboration events related to the file may be generated. In one example, the summary of the one or more collaboration events related to the file may be generated based on the most relevant collaboration events. In this regard, the summary may include the most relevant collaboration events determined from processing the mined data. In this regard, some of the collaboration events related to the file may be determined to be more relevant than others for including in the summary For example, it may be determined that including the top contributor of the file in the summary is more relevant than including the second or third top contributors in the summary In another example, it may be determined that including an upcoming meeting (e.g., a meeting scheduled in the near future) in the summary is more relevant than including a meeting scheduled further out into the future. In yet another example, it may be determined that including an upcoming calendar event (e.g., a calendar event scheduled in the near future) in the summary is more relevant than including a calendar event scheduled further out into the future. In yet another example, it may be determined that including a recent email in the summary is more relevant than including an older email in the summary.

The generated summary of the one or more collaboration events (e.g., the collaboration events determined to be most relevant) may be sent from the cloud environment 106 to the client computing device 104 for displaying the summarized view of the one or more collaborations events as a collaboration pane within the file. For example, as discussed herein, the user interface component 110 of the client computing device 104 may be configured to render and/or display the summarized view of the one or more collaboration events as a collaboration pane within the file. In one example, the collaboration events determined to be the most relevant may be included in a top portion of the summarized view of the one or more collaboration events. In another example, the summarized view of the one or more collaboration events may be arranged by the type of collaboration event. For example, the summarized view of the one or more collaboration events may include each type of collaboration event in a particular order. For example, the order may include top contributors followed by emails followed by meetings followed by heat maps followed by shares, and the like. It is appreciated that any ordering and/or arrangement of the collaboration events within the summarized view may be realized in conjunction with the present disclosure.

In one example, data store 140 may be part of and/or located at the data service 130. In another example, data store 140 may be a separate component and/or may be located separate from the data service 130. It is appreciated that although one cloud environment 106 is illustrated in FIG. 1, the data system 100 may include a plurality of cloud environments 106 with a plurality of data services 130 and a plurality of data stores 140. In some cases, the cloud environment 106 may include a plurality of data services 130 and a plurality of data stores 140. For example, the plurality of data services 130 may include at least file storage providers, external activity services and document editing clients. In one example, the data service 130 may include data services/cloud storage providers such as OneDrive® for Business, Sharepoint®, OneDrive® Consumer, and the like.

Referring now to FIG. 2A, one view 200A in a progression of views of an application displayed on a user interface of the client computing device 104, such as a desktop computer, tablet computer or a mobile phone, for example, is shown. The exemplary application, as shown in FIG. 2A, is an electronic slide application. In one example, an application may include any application suitable for collaboration and/or co-authoring such as word processing applications, spreadsheet applications, electronic slide presentation applications, email applications, chat applications, voice applications, and the like. In one case, a file associated with the application may include a word document, a spreadsheet, an electronic slide presentation, an email, a chat conversation, and the like. As such, an exemplary application may be an electronic slide presentation application, as illustrated in FIG. 2A. In this example, an exemplary file associated with the electronic slide presentation application may include an electronic slide presentation. As such, an exemplary summarized view of one or more collaboration events may include one or more collaboration events related to the electronic slide presentation.

As illustrated, the exemplary view 200A of the electronic slide application displayed on the client computing device 104 includes a file 204, a collaboration pane 206, and one or more collaboration events 208A-208C. The collaboration pane 206 includes a summarized view 220 of the one or more collaboration events 208A-208C. The collaboration events 208A-208C are exemplary collaboration events of the collaboration pane 206. It is appreciated that while FIG. 2A illustrates collaboration events 208A-208C of the collaboration pane 206, the discussion of collaboration events 208A-208C and the collaboration pane 206 is exemplary only and should not be considered as limiting. Any suitable number and/or type of collaboration events of the collaboration pane 206 may be displayed on the client computing device 104. Furthermore, while the present disclosure discusses the electronic slide application, file 204, and collaboration pane 206, this is only exemplary and should not be considered limiting. Any number of applications, files, and/or collaboration panes including summarized views of collaboration events may be utilized in conjunction with the present disclosure.

In the exemplary example illustrated in FIG. 2A, the file 204 is an electronic slide presentation. As discussed above, the file 204 may be any file of any application suitable for co-authoring and collaboration between one or more users/authors. As discussed above, the user interface component 110 and/or the suite of applications 112 may be configured to generate a summarized view (e.g., summarized view 220) including a summary of one or more collaboration events (e.g., collaboration events 208A-208C). The user interface component 110 and/or the suite of applications 112 may be configured to display the summarized view (e.g., summarized view 220) as a collaboration pane (e.g., collaboration pane 206) within the file 204. In the example illustrated in FIG. 2A, collaboration event 208A is a top contributor. In this example, collaboration event 208A includes two top contributors, Tina Smith and Dani Riley. In this regard, a user of the file 204 can quickly identify Tina Smith and Dani Riley as co-authors/collaborators to ask questions about the file 204.

Collaboration event 208B is an upcoming meeting that is directly related to the file 204. In this example, collaboration event 208B is a strategy session with one of the top contributors at 10 am, on Feb. 10, 2018. In one example, it may be determined that the strategy session is directly related to the file 204 by identifying a link to the file 204 in the meeting on the strategy session. In another example, it may be determined that the strategy session is directly related to the file 204 by identifying the name of the file 204 in the meeting (e.g., in the meeting subject, description, and the like). In this regard, as a user of the file 204 is interacting with the file 204, the user can quickly see that she has an upcoming meeting related to the file 204 and what the topic of the meeting is. For example, the meeting may include a strategy session regarding the file 204. Furthermore, the file 204 is associated with the electronic slide application illustrated in FIG. 2A and the collaboration event 208B is associated with another application (e.g., an email application, a calendar application). As such, the user may view the collaboration event 208B (e.g., the upcoming meeting) without leaving the electronic slide application. In other words, the user can view the collaboration event 208B (e.g., the upcoming meeting) without opening an additional application or window and without requiring the navigation through another application (e.g., an email or calendar application).

Collaboration event 208C is an upcoming meeting with attendees/collaborators who have edited the file 204. In this example, collaboration event 208C is an augmentation loop standup meeting with Dani Riley at 10:45 AM on Feb. 11, 1018. In this regard, Dani Riley is an attendee of the meeting and who has edited the file 204. As such, as a user of the file 204 is interacting with the file 204, the user can quickly see that she has an upcoming meeting with a collaborator of the file 204 who has edited the file 204. In turn, the user may have a question for the collaborator about the file 204 in the upcoming meeting (e.g., even if the upcoming meeting is related to a topic other than the file 204). As such, the user may view the collaboration event 208C (e.g., the upcoming meeting) without leaving the electronic slide application. In other words, the user can view the collaboration event 208C (e.g., the upcoming meeting) without opening an additional application or window and without requiring the navigation through another application (e.g., an email or calendar application). Furthermore, the user is reminded that she may need to ask a question to the attendee of the upcoming meeting who edited the file 204.

Figure 2B:
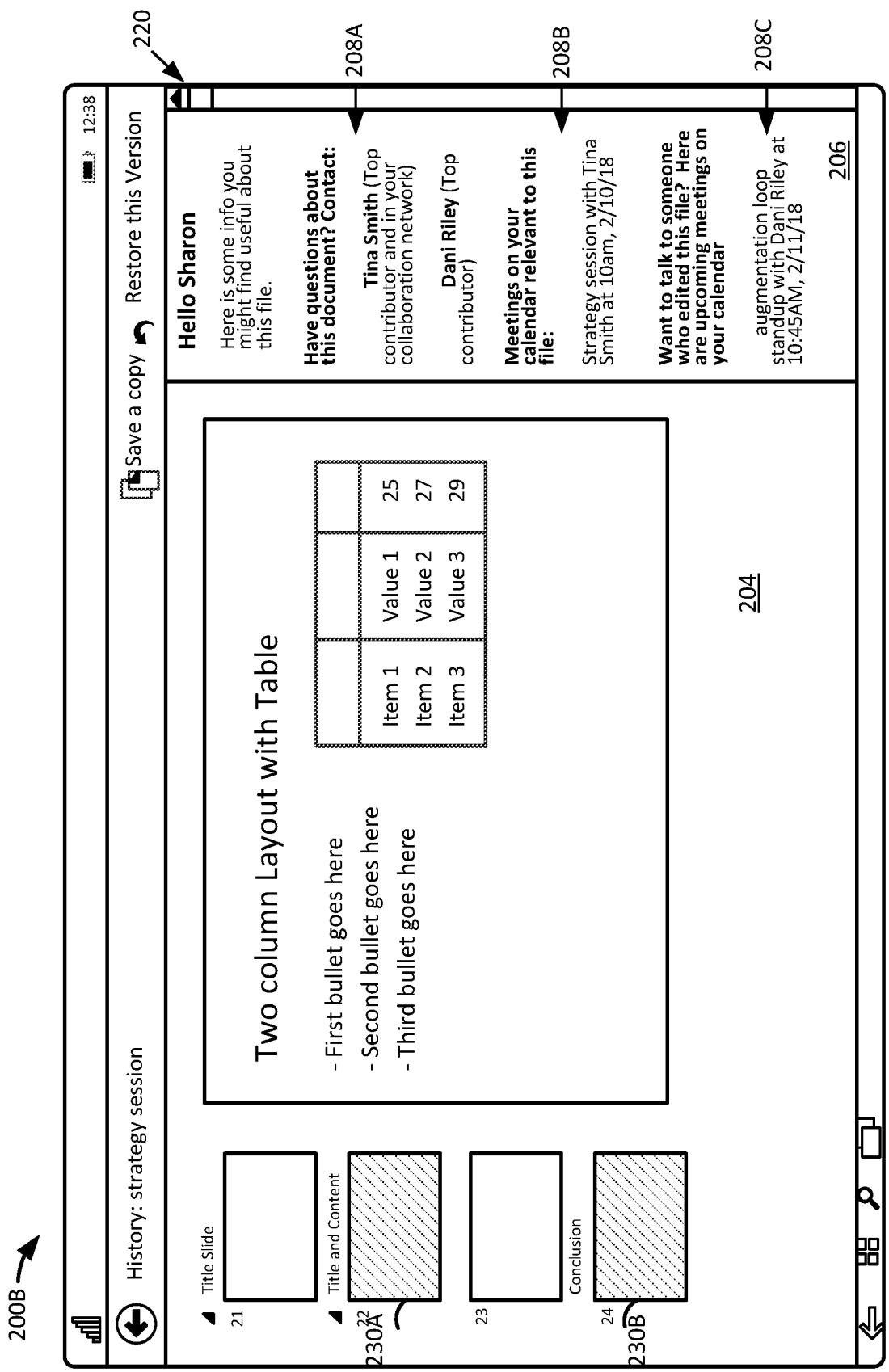
FIG. 2B illustrates another view in the progression of views of the application of FIG. 2A, according to an example aspect.

Referring now to FIG. 2B, another view 200B in a progression of views of an application displayed on a user interface of the client computing device 104, such as a desktop computer, tablet computer or a mobile phone, for example, is shown. The exemplary application, as shown in FIG. 2B, is an electronic slide application. As illustrated, similar to FIG. 2A, the exemplary view 200B of the electronic slide application displayed on the client computing device 104 includes the file 204, the collaboration pane 206, and the one or more collaboration events 208A-208C. Similar to FIG. 2A, the collaboration pane 206 includes the summarized view 220 of the one or more collaboration events 208A-208C.

FIG. 2B illustrates two additional collaboration events 230A and 230B. The collaboration events 230A and 230B are heat maps. For example, as illustrated in FIG. 2B, the collaboration events 230A and 230B (e.g., heat maps) indicate the portion of the file 204 that includes the highest level of activity within the file 204 by highlighting the portion of the file 204 that includes the highest level of activity. For example, as illustrated in FIG. 2B, slides 22 and 24 are highlighted. The heat maps may indicate the portion of the file 204 that includes the highest level of activity by highlighting with any method. For example, highlighting might include using different colors, patterns, and the like. As such, as a user is interacting with the file 204, the user can quickly identify the portions of the file 204 (e.g., in this case slides 22 and 24) having the highest level of activity. The highest level of activity may include the portion of the file 204 that has the most edits, comments, replies to comments, and the like during collaboration.

Figure 3A:
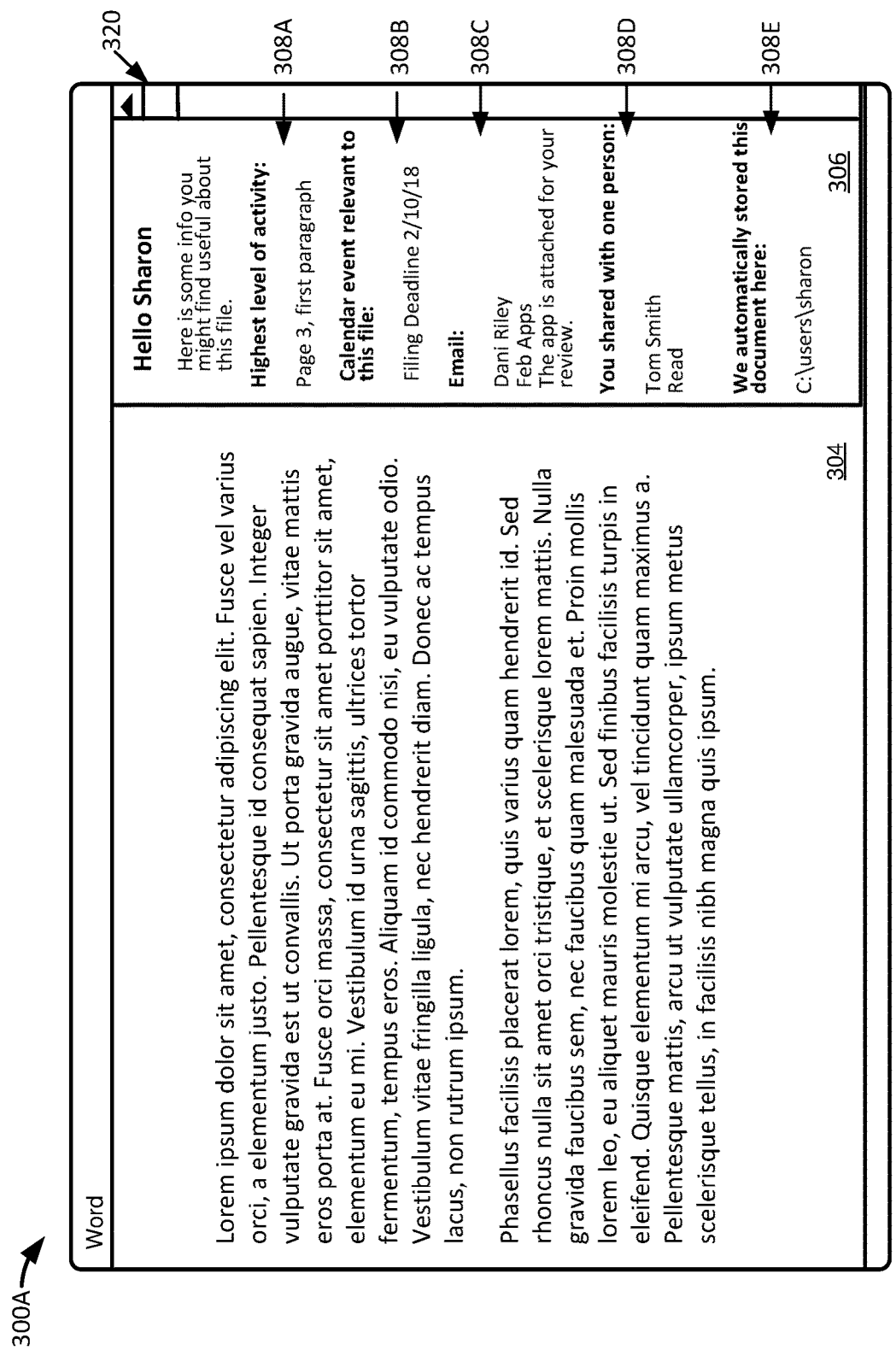
FIG. 3A illustrates one view in a progression of views of a word processing application, according to an example aspect.

Referring now to FIG. 3A, one view 300A in a progression of views of a word processing application displayed on a user interface of the client computing device 104, such as a desktop computer, tablet computer or a mobile phone, for example, is shown. In one example, an application may include any application suitable for collaboration and/or co-authoring such as word processing applications, spreadsheet applications, electronic slide presentation applications, email applications, chat applications, voice applications, and the like. In one case, a file associated with the application may include a word document, a spreadsheet, an electronic slide presentation, an email, a chat conversation, and the like. As such, an exemplary application may be a word processing application, as illustrated in FIG. 3A. In this example, an exemplary file associated with the word processing application may include aa word document. As such, an exemplary summarized view of one or more collaboration events may include one or more collaboration events related to the word document.

As illustrated, the exemplary view 300A of the word processing application displayed on the client computing device 104 includes a file 304, a collaboration pane 306, and one or more collaboration events 308A-308E. The collaboration pane 306 includes a summarized view 320 of the one or more collaboration events 308A-308E. The collaboration events 308A-308E are exemplary collaboration events of the collaboration pane 306. It is appreciated that while FIG. 3A illustrates collaboration events 308A-308E of the collaboration pane 306, the discussion of collaboration events 308A-308E and the collaboration pane 306 is exemplary only and should not be considered as limiting. Any suitable number and/or type of collaboration events of the collaboration pane 306 may be displayed on the client computing device 104. Furthermore, while the present disclosure discusses the word processing application, file 304, and collaboration pane 306, this is only exemplary and should not be considered limiting. Any number of applications, files, and/or collaboration panes including summarized views of collaboration events may be utilized in conjunction with the present disclosure.

In the exemplary example illustrated in FIG. 3A, the file 304 is a word document. As discussed above, the file 304 may be any file of any application suitable for co-authoring and collaboration between one or more users/authors. As discussed above, the user interface component 110 and/or the suite of applications 112 may be configured to generate a summarized view (e.g., summarized view 320) including a summary of one or more collaboration events (e.g., collaboration events 308A-308E). The user interface component 110 and/or the suite of applications 112 may be configured to display the summarized view (e.g., summarized view 320) as a collaboration pane (e.g., collaboration pane 306) within the file 304. In the example illustrated in FIG. 3A, collaboration event 308A is a heat map. In this example, collaboration event 308A indicates that the portion of the file 304 having the highest level of activity is page 3, first paragraph. In this regard, a user of the file 304 can quickly identify the portion of the file 304 that has the highest level of activity. In this regard, a user of the file 304 may quickly navigate to that portion of the file 304 for reviewing.

Collaboration event 308B is a calendar event that is relevant to the file 304. In this example, collaboration event 308B is a filing deadline of Feb. 10, 2018. That is, the calendar event is a deadline for filing the file 304. In this regard, as a user of the file 304 is interacting with the file 304, the user can quickly see that she has a deadline related to the file 304. Furthermore, the file 304 is associated with the word processing application illustrated in FIG. 3A and the collaboration event 308B is associated with another application (e.g., an email application, a calendar application). As such, the user may view the collaboration event 308B (e.g., the deadline) without leaving the word processing application. In other words, the user can view the collaboration event 308B (e.g., the calendar event/deadline) without opening an additional application or window and without requiring the navigation through another application (e.g., an email or calendar application).

Collaboration event 308C is an email surfaced from an email inbox. In this example, the collaboration event 308C is an email shared with the user that includes the file 304. In one example, the file 304 may be included in the email as an attachment. In another example, the file 304 may be included in the email via a link to the file 304. In this example, collaboration event 308C is an email from Dani Riley with the file 304 attached for review. As such, as a user of the file 304 is interacting with the file 304, the user can quickly see that she received an email regarding reviewing the file 304. As such, the user can review the file 304 as indicated in the email. As such, the user may view the collaboration event 308C (e.g., the email) without leaving the word processing application. In other words, the user can view the collaboration event 308C (e.g., the email) without opening an additional application or window and without requiring the navigation through another application (e.g., an email application). Furthermore, the user is reminded that she needs to review file 304.

Collaboration event 308D is a share collaboration event. In this example, the share collaboration event 308D indicates that the user has shared file 304 with one person/collaborator. In this example, the file 304 was shared with Tom Smith and the share collaboration event 308D indicates that Tom Smith has read/viewed the file 304. In this regard, the user of the file 304 may ping Tom Smith knowing he has read the file 304 to discuss the file 304. In another example, when a share collaboration event indicates that a person with whom the file is shared has not read the file, the user may ping the person to remind them to read the file (not illustrated).

Collaboration event 308E is a storage location collaboration event. In this example, the storage location collaboration event 308E indicates the location of where the file 304 is automatically saved to. In this example, the storage location is C:\users\sharon. In this regard, the user may quickly identify where the file 304 is saved and determine whether she wants to save the file 304 in a different location. Furthermore, the user may quickly identify where the file 304 is saved to for future reference when accessing the file 304.

Figure 3B:
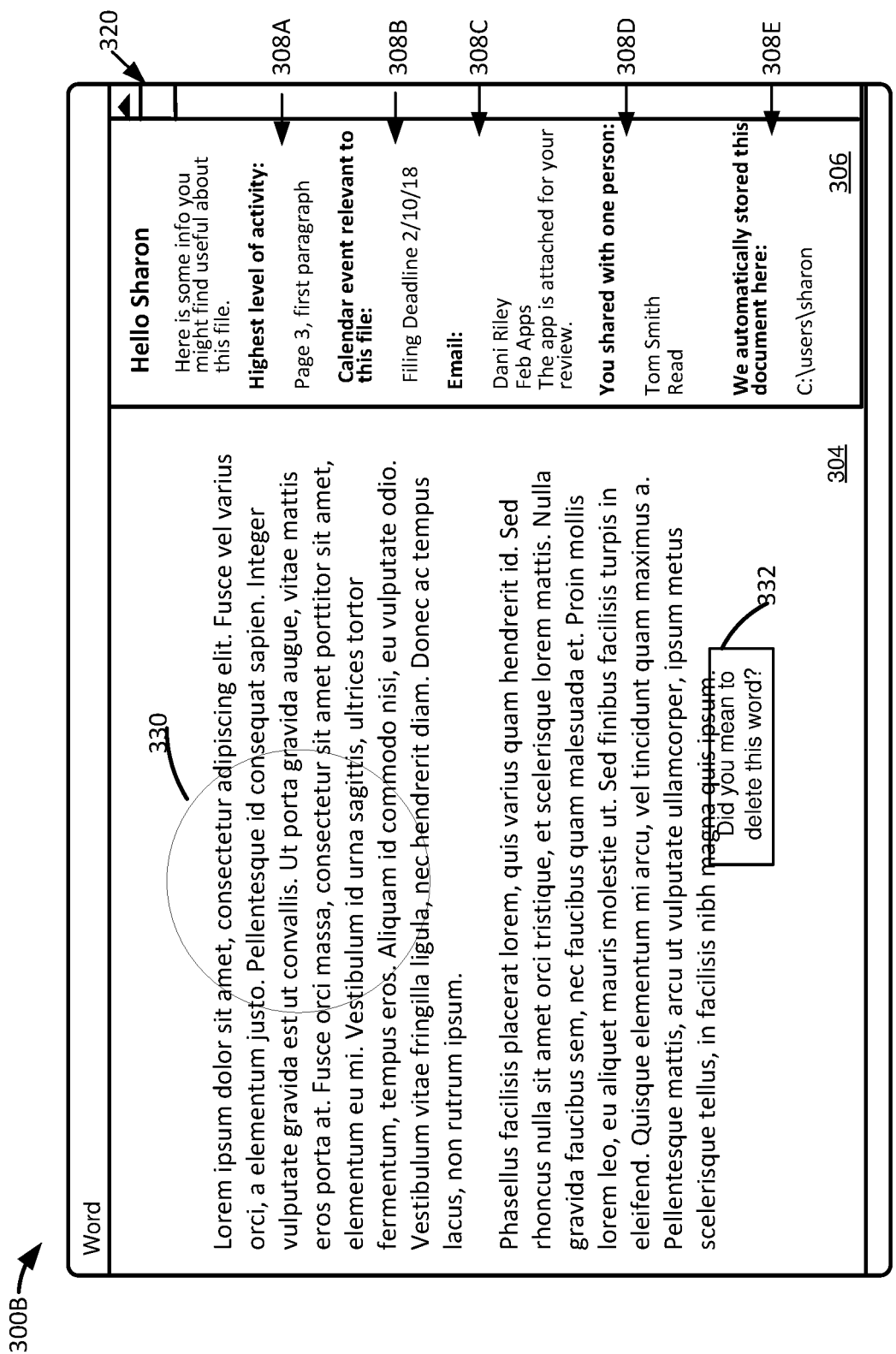
FIG. 3B illustrates another view in the progression of views of the word processing application of FIG. 3A, according to an example aspect.

Referring now to FIG. 3B, another view 300B in a progression of views of a word processing application displayed on a user interface of the client computing device 104, such as a desktop computer, tablet computer or a mobile phone, for example, is shown. The exemplary application, as shown in FIG. 3B, is a word processing application. As illustrated, similar to FIG. 3B, the exemplary view 300B of the word processing application displayed on the client computing device 104 includes the file 304, the collaboration pane 306, and the one or more collaboration events 308A-308E. Similar to FIG. 3A, the collaboration pane 306 includes the summarized view 320 of the one or more collaboration events 308A-308E.

FIG. 3B illustrates two additional collaboration events 330 and 332. The collaboration event 330 is a heat map. For example, as illustrated in FIG. 3B, the collaboration event 330 (e.g., heat maps) indicate the portion of the file 304 that includes the highest level of activity within the file 304 by highlighting the portion of the file 304 that includes the highest level of activity. For example, as illustrated in FIG. 3B, the first paragraph of the illustrated page is highlighted. The heat map may indicate the portion of the file 304 that includes the highest level of activity by highlighting with any method. For example, highlighting might include using different colors, patterns, and the like. As such, as a user is interacting with the file 304, the user can quickly identify the portions of the file 304 (e.g., in this case the first paragraph) having the highest level of activity. The highest level of activity may include the portion of the file 304 that has the most edits, comments, replies to comments, and the like during collaboration. The collaboration event 332 is an unwanted edit. For example, as illustrated in FIG. 3B, the collaboration event 332 includes the question, "Did you mean to delete this word?". As such, a potential unwanted edit is detected and the user is notified of the potential unwanted edit.

Figure 4:
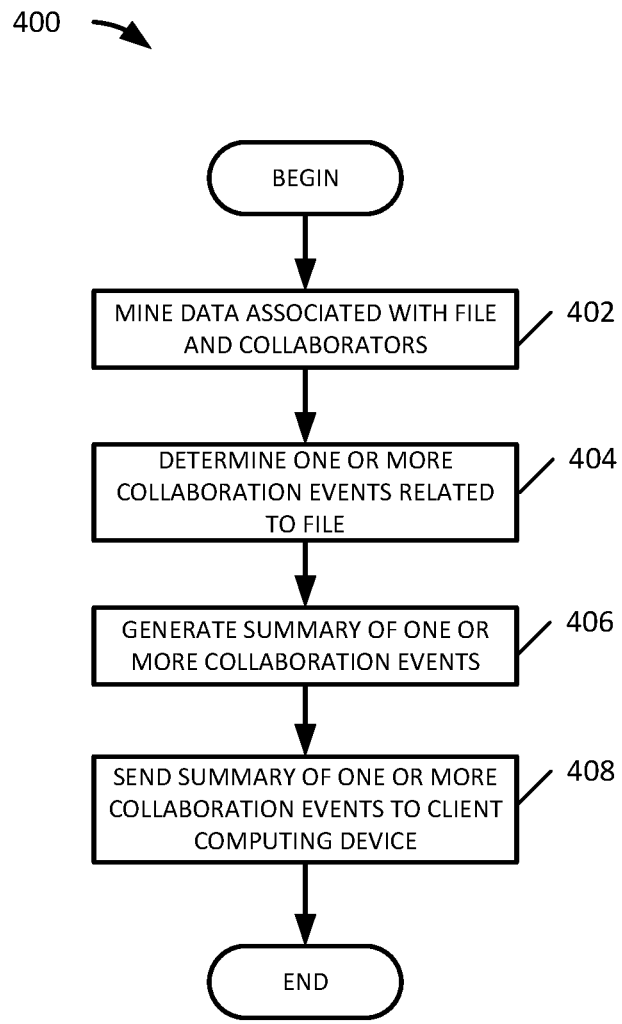
FIG. 4 illustrates an exemplary method for providing consumable collaboration insights related to a file, according to an example aspect.

Referring now to FIG. 4, an exemplary method 400 for providing consumable collaboration insights related to a file, according to an example aspect is shown. Method 400 may be implemented on a computing device or a similar electronic device capable of executing instructions through at least one processor. The consumable collaboration insights related to a file may be provided by any suitable software application. Additionally, the summarized view of the collaboration events may be displayed by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for providing consumable collaboration insights related to a file and displaying the file activity feed may be utilized by method 400.

Method 400 may begin at operation 402, where data associated with at least one of the file and collaborators of the file is mined. In one example, the data may be mined via extracting the data associated with at least one of the file and one or more collaborators of the file. In another example, the data may be mined via analyzing the data associated with at least one of the file and one or more collaborators of the file. In another example, the data may be mined via processing the data associated with at least one of the file and one or more collaborators of the file. In another example, the data may be mined via extracting, analyzing and processing the data associated with at least one of the file and collaborators of the file. In one example, the data associated with the one or more files, documents, items and the data associated with collaborators of the files, documents, items may include content changes, communication activities, document content exchanges, permission requests, sharing, printing, a time associated with the activities related to the file (e.g., the time the file is printed, the time the file was shared, the time the file was edited), communications such as Instant Messaging and/or voice communications, comments, replies to comments, email activities, presentation of the file, a time at which the file is printed, a time at which the file is co-authored, the recipient of a shared file, information associated with a renamed file, sharing a file, editing a file, renaming a file, information associated with a restored file (e.g., information regarding that the file was restored from a second version to a first version), and the like. In one case, email activities may include a time at which a file was emailed, the content of the file at the time at which the file was emailed, the sender and recipient of the email, and the like.

When data associated with at least one of the file and collaborators of the file is mined, flow proceeds to operation 404 where one or more collaboration events related to the file is determined using the mined data. For example, the one or more collaboration events may be determined by identifying collaborators of the file, linking interactions with the file by the identified collaborators with data associated with collaboration events, identifying and linking collaborators of the file, interactions with the file, historical data associated with the file, and the data associated with the file (as discussed herein), and the like. In one example, the one or more collaboration events include at least one of a meeting, a calendar event, an email, a top contributor, a heat map, a share, an unwanted edit, and a storage location.

When one or more collaboration events related to the file is determined using the mined data, flow proceeds to operation 406 where a summary of the one or more collaboration events related to the file is generated. In one example, the summary of the one or more collaboration events related to the file may be generated based on the most relevant collaboration events. In this regard, the summary may include the most relevant collaboration events determined from processing the mined data. In this regard, some of the collaboration events related to the file may be determined to be more relevant than others for including in the summary. For example, it may be determined that including the top contributor of the file in the summary is more relevant than including the second or third top contributors in the summary. In another example, it may be determined that including an upcoming meeting (e.g., a meeting scheduled in the near future) in the summary is more relevant than including a meeting scheduled further out into the future. In yet another example, it may be determined that including an upcoming calendar event (e.g., a calendar event scheduled in the near future) in the summary is more relevant than including a calendar event scheduled further out into the future. In yet another example, it may be determined that including a recent email in the summary is more relevant than including an older email in the summary When a summary of the one or more collaboration events related to the file is generated, flow proceeds to operation 408 where the summary of the one or more collaboration events is sent to a client computing device for displaying a summarized view of the one or more collaboration events as a collaboration pane within the file. The generated summary of the one or more collaboration events (e.g., the collaboration events determined to be most relevant) may be sent from the cloud environment to the client computing device for displaying the summarized view of the one or more collaborations events as a collaboration pane within the file. For example, as discussed herein, the user interface component of the client computing device may be configured to render and/or display the summarized view of the one or more collaboration events as a collaboration pane within the file. In one example, the collaboration events determined to be the most relevant may be included in a top portion of the summarized view of the one or more collaboration events. In another example, the summarized view of the one or more collaboration events may be arranged by the type of collaboration event. For example, the summarized view of the one or more collaboration events may include each type of collaboration event in a particular order. For example, the order may include top contributors followed by emails followed by meetings followed by heat maps followed by shares, and the like. It is appreciated that any ordering and/or arrangement of the collaboration events within the summarized view may be realized in conjunction with the present disclosure.

Figure 5:
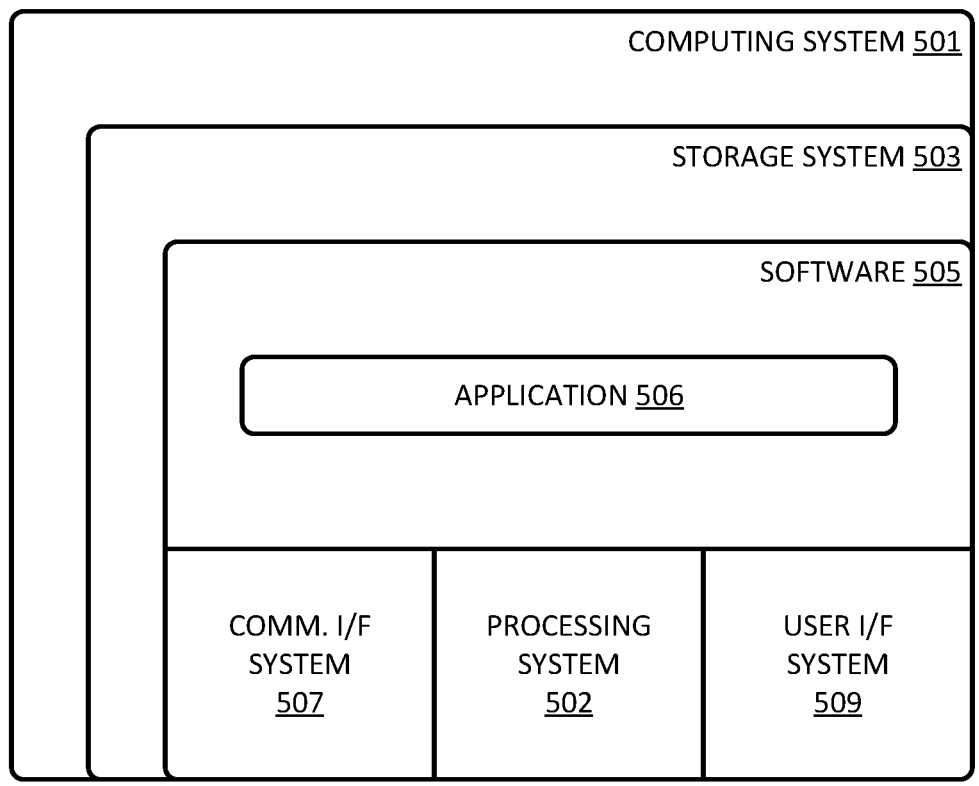
FIG. 5 illustrates a computing system suitable for implementing the enhanced collaboration technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including electronic slide applications and word processing applications described herein. When executed by processing system 502 to enhance collaboration, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non- virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced collaboration systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced collaboration systems. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising one or more computer readable storage media; and program instructions stored on the one or more computer readable storage media that, when executed by at least one processor, cause the at least one processor to at least: mine data associated with at least one of a file and collaborators of the file; determine one or more collaboration events related to the file using the mined data; generate a summary of the one or more collaboration events related to the file; and send the summary of the one or more collaboration events to a client computing device for displaying a summarized view of the one or more collaboration events as a collaboration pane within the file. In further examples, the file is associated with a first application, and wherein at least some of the one or more collaboration events are associated with a second application. In further examples, at least some of the one or more collaboration events associated with the second application are viewable without leaving the first application. In further examples, the one or more collaboration events include at least one of a meeting, a calendar event, an email, a top contributor, a heat map, a share, an unwanted edit, and a storage location. In further examples, the data includes at least one of messaging data, communication activities, comments, replies to comments, email activities, a presentation of the file, a time at which the file is printed, and a time at which the file is co-authored, a recipient of a shared file, renaming a file, editing a file, sharing a file, @mentions, and information associated with a restored file. In further examples, the top contributor is a primary author of the file. In further examples, the meeting includes a link to the file indicating the meeting is connected to the file. In further examples, the meeting includes collaborators of the file as participants in the meeting.

Further aspects disclosed herein provide an exemplary computer-implemented method for providing consumable collaboration insights related to a file, the method comprising: mining data associated with at least one of the file and collaborators of the file; determining one or more collaboration events related to the file using the mined data; generating a summary of the one or more collaboration events related to the file; and sending the summary of the one or more collaboration events to a client computing device for displaying a summarized view of the one or more collaboration events as a collaboration pane within the file. In further examples, the one or more collaboration events include at least one of a meeting, a calendar event, an email, a top contributor, a heat map, a share, an unwanted edit, and a storage location. In further examples, the heat map indicates a portion of the file that includes a highest level of activity within the file. In further examples, the heat map indicates the portion of the file that includes the highest level of activity within the file by highlighting the portion of the file that includes the highest level of activity. In further examples, the share indicates at least a number of collaborators the file is shared with, the collaborators names, and which collaborators have read the file. In further examples, the unwanted edit indicates an edit made to the file by mistake. In further examples, the storage location is a location where the file is automatically stored based on one or more factors.

Additional aspects disclosed herein provide exemplary systems comprising: one or more computer readable storage media; and program instructions stored on the one or more computer readable storage media that, when executed by at least one processor, cause the at least one processor to at least: initiate rendering of a file associated with an application in a user interface of a client computing device; obtain content associated with the file from a data service, where the content associated with the file includes at least one or more collaboration events related to the file; generate a summarized view using the one or more collaboration events related to the file; and display the summarized view as a collaboration pane within the file in the user interface. In further examples, the summarized view includes a summary of the one or more collaboration events related to the file. In further examples, at least some of the one or more collaboration events are associated with another application. In further examples, the one or more collaboration events include at least one of a meeting, a calendar event, an email, a top contributor, a heat map, a share, an unwanted edit, and a storage location. In further examples, at least some of the one or more collaboration events are viewable without leaving the application.

Techniques for providing consumable collaboration insights related to a file in a collaboration environment are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of collaboration systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
one or more non-transitory computer readable storage media; and
program instructions stored on the one or more non-transitory computer readable storage media that, when executed by at least one processor, cause the at least one processor to at least:
mine data associated with a file and collaborators of the file, wherein the file is associated with a word processing application;
identify, in the data, collaboration events that involved the file and occurred in the past in an email application, wherein the collaboration events comprise a calendar event, email activity, editing activity, and sharing activity;
generate a summary indicating at least the collaboration events; and
enable display of the summary of the collaboration events on a client computing device such that when the file is open in a window of the word processing application, a collaboration pane in the window of the word processing application is displayed, wherein the collaboration pane includes at least the summary.

2. The system of claim 1, wherein the program instructions, when executed by the at least one processor, further cause the at least one processor to:
mine data associated with a second file and collaborators of the second file, wherein the second file is associated with a presentation application; and
identify a second collaboration event that involved the second file and occurred in a calendar application.

3. The system of claim 1, wherein past details about the collaboration events from the email application are viewable without leaving the word processing application.

4. The system of claim 1, wherein the collaboration events include at least a meeting.

5. The system of claim 4, wherein the meeting includes a link to the file indicating the meeting is connected to the file.

6. The system of claim 4, wherein the meeting includes the collaborators of the file as participants in the meeting.

7. The system of claim 1, wherein the data includes at least one of messaging data, communication activities, comments, replies to comments, a presentation of the file, a time at which the file is printed, and a time at which the file is co-authored, a recipient of a shared file, renaming the file, editing the file, sharing the file, @mentions, and information associated with a restored version of the file.

8. The system of claim 1, wherein the collaboration events include a top contributor, wherein the top contributor is a primary author of the file.

9. A computer-implemented method for providing consumable collaboration insights related to a file, the method comprising:
mining data associated with the file and collaborators of the file, wherein the file is associated with a word processing application;
identifying, in the data, collaboration events that involved the file and that occurred in the past in an email application, wherein the collaboration events comprise a calendar event, email activity, editing activity, and sharing activity;
generating a summary indicating at least of the collaboration events; and
enabling display of the summary of the collaboration events on a client computing device such that when the file is open in a window of the word processing application, a collaboration pane in the window of the word processing application is displayed, wherein the collaboration pane includes at least the summary.

10. The computer-implemented method of claim 9, wherein the collaboration event includes at least one of a meeting, a top contributor, a heat map, a share, an edit, and a storage location.

11. The computer-implemented method of claim 10, wherein the heat map indicates a portion of the file that includes a highest level of activity within the file.

12. The computer-implemented method of claim 11, wherein the heat map indicates the portion of the file that includes the highest level of activity within the file by highlighting the portion of the file that includes the highest level of activity.

13. The computer-implemented method of claim 10, wherein the share indicates at least a number of collaborators the file is shared with, names of the collaborators, and which collaborators have read the file.

14. The computer-implemented method of claim 10, wherein the data includes at least one of messaging data, communication activities, comments, replies to comments, a presentation of the file, a time at which the file is printed, and a time at which the file is co-authored, a recipient of a shared file, renaming the file, editing the file, @mentions, and information associated with a restored version of the file.

15. The computer-implemented method of claim 10, wherein the storage location is a location where the file is automatically stored based on one or more factors.

16. A system comprising:
one or more non-transitory computer readable storage media; and
program instructions stored on the one or more non-transitory computer readable storage media that, when executed by at least one processor, cause the at least one processor to at least:
initiate rendering of a file in a user interface of a client computing device, wherein the file is associated with a word processing application;
obtain content associated with the file from a data service, where the content associated with the file includes collaboration events that involved the file in an email application, wherein the collaboration events comprise a calendar event, email activity, editing activity, and sharing activity;
generate a summarized view indicating at least the collaboration events; and
display the summarized view as a collaboration pane of the word processing application in the user interface when the file is open in a window of the word processing application, wherein the collaboration pane includes at least the summarized view.

17. The system of claim 16, wherein the summarized view includes a summary of the collaboration events related to the file.

18. The system of claim 16, wherein the content associated with the file further includes a collaboration event that involved the file in a calendar application.

19. The system of claim 16, wherein the collaboration events includes at least one of a meeting, a top contributor, a heat map, a share, an edit, and a storage location.

20. The system of claim 16, wherein the collaboration event is viewable without leaving the word processing application.

* * * * *